United States Patent [19]
Shiomi et al.

[11] Patent Number: 5,280,564
[45] Date of Patent: Jan. 18, 1994

[54] NEURAL NETWORK HAVING AN OPTIMIZED TRANSFER FUNCTION FOR EACH NEURON

[75] Inventors: Kazuyuki Shiomi; Sei Watanabe, both of Saitama, Japan

[73] Assignee: Honda Giken Kogyo Kabushiki Kaisha, Tokyo, Japan

[21] Appl. No.: 836,593

[22] Filed: Feb. 18, 1992

[30] Foreign Application Priority Data

Feb. 20, 1991 [JP] Japan ................................ 3-45613

[51] Int. Cl.$^5$ ................................................ G06F 15/00
[52] U.S. Cl. ........................................ 395/23; 395/24; 395/27
[58] Field of Search .............................. 395/23, 24, 27

[56] References Cited

U.S. PATENT DOCUMENTS

| | | | |
|---|---|---|---|
| 4,945,494 | 7/1990 | Penz et al. | 395/24 |
| 5,043,913 | 8/1991 | Furutani | 395/27 |
| 5,046,020 | 9/1991 | Filkin | 395/23 |
| 5,113,483 | 5/1992 | Keeler et al. | 395/23 |
| 5,119,469 | 6/1992 | Alkon et al. | 395/23 |
| 5,134,685 | 7/1992 | Rosenbluth | 395/23 |
| 5,167,006 | 11/1992 | Furuta et al. | 395/27 |
| 5,187,680 | 2/1993 | Engeler | 395/27 |

FOREIGN PATENT DOCUMENTS

| | | |
|---|---|---|
| 3-36659 | 2/1991 | Japan . |
| 3-90956 | 4/1991 | Japan . |

*Primary Examiner*—Michael R. Fleming
*Assistant Examiner*—Tariq R. Hafiz
*Attorney, Agent, or Firm*—Pollock, VandeSande and Priddy

[57] ABSTRACT

The characteristic data for determining the characteristics of the transfer functions (for example, sigmoid functions) of the neurons of the hidden layer and the output layer (the gradients of the sigmoid functions) of a neural network are learned and corrected in a manner similar to the correction of weighting data and threshold values. Since at least one characteristic data which determines the characteristics of the transfer function of each neuron is learned, the transfer function characteristics can be different for different neurons in the network independently of the problem and/or the number of neurons, and be optimum. Accordingly, a learning with high precision can be performed in a short time.

11 Claims, 14 Drawing Sheets

FIG. 24A $$f(x) = \frac{1}{1 + e^{-kx}} \qquad \text{Eq. 1}$$

$$f'(x) = \frac{k \cdot e^{-kx}}{(1 + e^{-kx})^2} = k \cdot f(x) \cdot (1 - f(x)) \qquad \text{Eq. 2}$$

$$E = \frac{1}{2} \sum_{r=1}^{R} (T(r) - XO3(r))^2 \qquad \text{Eq. 11}$$

$$\frac{\partial E}{\partial W23(q,r)} = \frac{\partial E}{\partial XO3(r)} \cdot \frac{\partial XO3(r)}{\partial XI3(r)} \cdot \frac{\partial XI3(r)}{\partial W23(q,r)} \qquad \text{Eq. 12}$$

$$\frac{\partial E}{\partial \theta 3(r)} = \frac{\partial E}{\partial XO3(r)} \cdot \frac{\partial XO3(r)}{\partial \theta 3(r)} \qquad \text{Eq. 13}$$

$$\frac{\partial E}{\partial W12(p,q)} = \sum_{r=1}^{R} \left\{ \frac{\partial E}{\partial XO3(r)} \cdot \frac{\partial XO3(r)}{\partial XI3(r)} \cdot \frac{\partial XI3(r)}{\partial XO2(q)} \right\} \cdot \frac{\partial XO2(q)}{\partial XI2(q)} \cdot \frac{\partial XI2(q)}{\partial W12(p,q)} \qquad \text{Eq. 14}$$

$$\frac{\partial E}{\partial \theta 2(q)} = \sum_{r=1}^{R} \left\{ \frac{\partial E}{\partial XO3(r)} \cdot \frac{\partial XO3(r)}{\partial XI3(r)} \cdot \frac{\partial XI3(r)}{\partial XO2(q)} \right\} \cdot \frac{\partial XO2(q)}{\partial \theta 2(q)} \qquad \text{Eq. 15}$$

FIG. 24B $$\Delta W12(p,q)0 = -\frac{\partial E}{\partial W12(p,q)} \qquad \text{Eq. 16}$$

$$\Delta\theta2(q)0 = -\frac{\partial E}{\partial\theta2(q)} \qquad \text{Eq. 17}$$

$$\Delta W23(q,r)0 = -\frac{\partial E}{\partial W23(q,r)} \qquad \text{Eq. 18}$$

$$\Delta\theta3(r)0 = -\frac{\partial E}{\partial\theta3(r)} \qquad \text{Eq. 19}$$

$$\left.\begin{array}{l}\text{CURRENT CHANGING AMOUNTS: } \Delta W12(p,q)0,\ \Delta\theta2(q)0,\ \Delta W23(q,r)0,\ \Delta\theta3(r)0 \\ \text{ONE-TIME-BEFOFE CHANGING AMOUNTS: } \Delta W12(p,q)1,\ \Delta\theta2(q)1,\ \Delta W23(q,r)1,\ \Delta\theta3(r)1 \\ \text{TWO-TIME-BEFOFE CHANGING AMOUNTS: } \Delta W12(p,q)2,\ \Delta\theta2(q)2,\ \Delta W23(q,r)2,\ \Delta\theta3(r)2 \\ \qquad\vdots \\ \text{N-TIME-BEFOFE CHANGING AMOUNTS: } \Delta W12(p,q)N,\ \Delta\theta2(q)N,\ \Delta W23(q,r)N,\ \Delta\theta3(r)N\end{array}\right\} \text{Eq. 20}$$

$$\left.\begin{array}{l}\text{CURRENT CHANGING COEFFICIENTS: } \alpha0,\ \beta0 \\ \text{ONE-TIME-BEFOFE CHANGING COEFFICIENTS: } \alpha1,\ \beta1 \\ \text{TWO-TIME-BEFOFE CHANGING COEFFICIENTS: } \alpha2,\ \beta2 \\ \qquad\vdots \\ \text{N-TIME-BEFOFE CHANGING COEFFICIENTS: } \alpha N,\ \beta N\end{array}\right\} \text{Eq. 21}$$

FIG. 24C $$\Delta W12(p,q) = \alpha_0 \cdot \Delta W12(p,q)_0 + \alpha_1 \cdot \Delta W12(p,q)_1 + \alpha_2 \cdot \Delta W12(p,q)_2 + \cdots + \alpha_N \cdot \Delta W12(p,q)_N \quad \text{Eq. 22}$$

$$\Delta \theta 2(q) = \beta_0 \cdot \Delta \theta 2(q)_0 + \beta_1 \cdot \Delta \theta 2(q)_1 + \beta_2 \cdot \Delta \theta 2(q)_2 + \cdots + \beta_N \cdot \Delta \theta 2(q)_N \quad \text{Eq. 23}$$

$$\Delta W23(q,r) = \alpha_0 \cdot \Delta W23(q,r)_0 + \alpha_1 \cdot \Delta W23(q,r)_1 + \alpha_2 \cdot \Delta W23(q,r)_2 + \cdots + \alpha_N \cdot \Delta W23(q,r)_N \quad \text{Eq. 24}$$

$$\Delta \theta 3(r) = \beta_0 \cdot \Delta \theta 3(r)_0 + \beta_1 \cdot \Delta \theta 3(r)_1 + \beta_2 \cdot \Delta \theta 3(r)_2 + \cdots + \beta_N \cdot \Delta \theta 3(r)_N \quad \text{Eq. 25}$$

$$\frac{\partial E}{\partial k3(r)} = \frac{\partial E}{\partial X03(r)} \cdot \frac{\partial X03(r)}{\partial k3(r)} \quad \text{Eq. 26}$$

$$\frac{\partial E}{\partial k2(q)} = \sum_{r=1}^{R} \left\{ \frac{\partial E}{\partial X03(r)} \cdot \frac{\partial X03(r)}{\partial XI3(r)} \cdot \frac{\partial XI3(r)}{\partial X02(q)} \right\} \cdot \frac{\partial X02(q)}{\partial k2(q)} \quad \text{Eq. 27}$$

$$\Delta k2(q)_0 = -\frac{\partial E}{\partial k2(q)} \quad \text{Eq. 28}$$

$$\Delta k3(r)_0 = -\frac{\partial E}{\partial k3(r)} \quad \text{Eq. 29}$$

FIG. 24D $$\left.\begin{array}{r}\text{CURRENT CHANGING AMOUNTS: } \Delta k2(q)0,\ \Delta k3(r)0 \\ \text{ONE-TIME-BEFORE CHANGING AMOUNTS: } \Delta k2(q)1,\ \Delta k3(r)1 \\ \text{TWO-TIME-BEFORE CHANGING AMOUNTS: } \Delta k2(q)2,\ \Delta k3(r)2 \\ \vdots \\ \text{N-TIME-BEFORE CHANGING AMOUNTS: } \Delta k2(q)N,\ \Delta k3(r)N\end{array}\right\} \quad \text{Eq. 30}$$

$$\left.\begin{array}{r}\text{CURRENT CHANGING COEFFICIENTS: } \gamma 0 \\ \text{ONE-TIME-BEFORE CHANGING COEFFICIENTS: } \gamma 1 \\ \text{TWO-TIME-BEFORE CHANGING COEFFICIENTS: } \gamma 2 \\ \vdots \\ \text{N-TIME-BEFORE CHANGING COEFFICIENTS: } \gamma N\end{array}\right\} \quad \text{Eq. 31}$$

$$\Delta k2(q) = \gamma 0 \cdot \Delta k2(q)0 + \gamma 1 \cdot \Delta k2(q)1 + \gamma 2 \cdot \Delta k2(q)2 + \cdots + \gamma N \cdot \Delta k2(q)N \qquad \text{Eq. 32}$$

$$\Delta k3(r) = \gamma 0 \cdot \Delta k3(r)0 + \gamma 1 \cdot \Delta k3(r)1 + \gamma 2 \cdot \Delta k3(r)2 + \cdots + \gamma N \cdot \Delta k3(r)N \qquad \text{Eq. 33}$$

$$\left.\begin{array}{l} f(k,x) = \dfrac{1}{1 + e^{-kx}} \\[1em] \dfrac{\partial f(k,x)}{\partial x} = \dfrac{k \cdot e^{-kx}}{(1 + e^{-kx})^2} = k \cdot f(k,x) \cdot (1 - f(k,x)) \\[1em] \dfrac{\partial f(k,x)}{\partial k} = \dfrac{k \cdot e^{-kx}}{(1 + e^{-kx})^2} = k \cdot f(k,x) \cdot (1 - f(k,x)) \end{array}\right\} \quad \text{Eq. 34}$$

NEURAL NETWORK HAVING AN OPTIMIZED TRANSFER FUNCTION FOR EACH NEURON

BACKGROUND OF THE INVENTION

1. Field of the Invention

The present invention is related to a neural network and particularly to a neural network which can learn with high precision and at a high speed.

2. Description of the Prior Art

Neural networks which perform signal operations in parallel using neurons that process signals in a similar manner to neural elements can be provided with many functions such as (1) a pattern recognition function,
(2) an interpolation function, and
(3) predicting and optimizing multivariable functions, and have attracted considerable attention as new information processing means not only in the manufacturing industry but also in a variety of fields such as medical science and economic forecast.

In a neural network of a hierarchical structure consisting of an input layer, a hidden layer and an output layer, a learning algorithm of back propagation using training data has been known.

The learning algorithm based on the conventional back propagation operation is described below.

FIG. 14 shows an example of the neural network of a three-layer structure, wherein the input layer consists of P neurons $100(p)$ ($p=1 \sim P$), the hidden layer consists of Q neurons $200(q)$ ($q=1 \sim Q$) and the output layer consists of R neurons $300(r)$ ($r=1 \sim R$). In this example, $P=4$, $Q=6$ and $R=2$. The numbers of neurons included in the input and output layers depend on the number of input and output data, and the number of neurons of the hidden layer can arbitrarily be set.

FIG. 15 is a conceptual diagram showing a neuron (unit) which is an element of a neural network. Each neuron fetches data obtained by respectively multiplying a plurality of supplied data $X(1) \sim X(n)$ by each of weights $W(1) \sim W(n)$ as input data, and calculates a value "x" by subtracting a threshold value $\theta$ from the total sum $\Sigma W(n)X(n)$ of them. And, as a transfer function $f(x)$ with this "x" as a variable, a function which can be differentiated by "x" is used. A sigmoid function, a typical example of transfer function, is described in equation (1) in FIG. 24A.

The relationships between "x" and $f(x)$ when coefficient "k" of the sigmoid function (hereinafter referred to as gradient "k") is assumed to be 0.1, 1.0 and 10 are shown in FIG. 16, and the differentiated value of the sigmoid function is shown in equation (2) in FIG. 24A.

With reference to FIG. 17, a learning algorithm by the conventional back propagation is now described. XO1(1), XO1(2), ... XO1(P) are output data of the individual neurons $100(p)$ in the input layer, XO2(1), XO2(2), ... XO2(Q) are output data of the individual neurons $200(q)$ in the hidden layer, XO3(1), XO3(2), .. . XO3(R) are output data of the individual neurons $300(r)$ in the output layer, XI2(1), XI2(2), ... XI2(Q) are input data of the individual neurons $200(q)$ in the hidden layer, XI3(1), XI3(2), ... XI3(R) are input data of the individual neurons $300(r)$ in the output layer, and T(1), T(2), ... T(R) are training data.

W12 is weighting data for obtaining input data of the hidden layer from output data of the input layer, and W12(1,1) is weighting data when the output XO(1) is given to XI2(1,1) and W12(2,2) is weighting data when the output XO1(2) is given to XI2(2) In general, W12(P,Q) is weighting data when XO1(P) is given to XI2(Q). Accordingly, although not shown, for instance, the weighting data when XO1(2) is given to XI2(1) is W12(2,1), and that when XO1(P) is given to XI2(1) is W12(p,1).

Similarly, W23 is weighting data for obtaining input data of the output layer from output data of the hidden layer, and in general, W23(Q,R) is weighting data when XO2(Q) is given to XI3(R). $\theta2(1), \theta2(2), \ldots \theta2(Q)$ are threshold values of the hidden layer, and $\theta3(1), \theta3(2), \ldots \theta3(R)$ are threshold values of the output layer.

XI2(1), input data of the hidden layer, is expressed by equation (3).

$$XI2(1) = XO1(1) \times W12(1,1) + XO1(2) \times W12(2,1) + \ldots + XO1(P) \times W12(P,1) \quad (3)$$

Similarly, XI2(Q) is expressed by equation (4).

$$XI2(Q) = XO1(1) \times W12(1,Q) + XO1(2) \times W12(2,Q) + \ldots + XO1(P) \times W12(P,Q) \quad (4)$$

XI3(1), input data of the output layer, is expressed by equation (5).

$$XI3(1) = XO2(1) \times W23(1,1) + XO2(2) \times W23(2,1) + \ldots + XO2(Q) \times W23(Q,1) \quad (5)$$

Similarly, XI3(R) is expressed by equation (6).

$$XI3(R) = XO2(1) \times W23(1,R) + XO2(2) \times W23(2,R) + \ldots + XO2(Q) \times W23(Q,R) \quad (6)$$

In the hidden layer, output data XO2(1) is obtained from input data XI2(1) by the equation (7).

$$\begin{aligned} XO2(1) &= f(x) \\ &= 1/(1 + e^{-kx}) \\ \text{Since } x &= \{XI2(1) - \theta2(1)\}, \\ XO2(1) &= f\{XI2(1) - \theta2(1)\} \end{aligned} \quad (7)$$

Similarly, the calculation for obtaining XO2(Q) from XI2(Q) is based on equation (8).

$$XO2(Q) = f\{XI2(Q) - \theta2(Q)\} \quad (8)$$

The calculation for obtaining XO3(1) from input data XI3(1) and the calculation for obtaining XO3(R) from input data XI3(R) are based on equations (9) and (10), respectively.

$$XO3(1) = f\{XI3(1) - \theta3(1)\} \quad (9)$$

$$XO3(R) = f\{XI3(R) - \theta3(R)\} \quad (10)$$

When output data XO3(r) ($r=1 \sim R$) have been obtained from the R neurons constituting the output layer for data XO1(p) ($p=1 \sim P$) given to the P neurons constituting the input layer, as described above, error data E are calculated on the basis of a predetermined cost function using the output data XO3(r) ($r=1 \sim R$) and training data T(r) ($r=1 \sim R$). When training data are used as in this example, such an error function as shown in equation (11) of FIG. 24A can be used as a cost function. Then, equations (12) to (15) are calculated using the error or cost function E.

Equations (12) to (15) of FIG. 24A represent partial differentiations of the error or cost function E by weighting variables W23(q,r), threshold variables $\theta3(r)$, weighting variables $W12(p,q)$ and threshold variables $\theta2(q)$, respectively. That is, in equation (12), E is partially differentiated by all the combinations of $W23(q,r)$ (all the combinations of $q=1\sim Q$ and $r=1\sim R$, namely, $W23(1,1)$, $W23(2,1)$, ..., $W23(Q,1)$, $W23(1,2)$, $W23(2,2)$, ..., $W23(Q,2)$, ..., $W23(1,R)$, $W23(2,R)$, ..., $W23(Q,R)$). Similarly for equations (13) to (15), E is partially differentiated using all of the threshold variables $\theta3(r)$, weighting variables $W12(p,q)$ and threshold variables $\theta2(q)$.

Then, the changing amount of current processing of each weighting data or threshold value $\Delta W12(p,q)0$, $\Delta\theta2(q)0$, $\Delta W23(q,r)0$ and $\Delta\theta3(r)0$ are determined from equations (16) to (19).

The various changing amounts in one time before (previous), two times before, ..., and N times before precessings are discriminated by replacing the suffix 0 for the changing amount in current processing shown in equations (16) to (19) with $1\sim N$, as shown in equation (20). Further, the various changing coefficients in current, one time before, two times before, ..., and N times before processings are determined by an equation (21).

These changing coefficients $\alpha 0\sim\alpha N$ and $\beta 0\sim\beta N$ may be preset to any values. The accumulated changing amounts $\Delta W12(p,q)$, $\Delta\theta2(q)$, $\Delta W23(q,r)$ and $\Delta\theta3(r)$ used in current processing are calculated from equations (22) to (25).

The accumulated changing amounts $\Delta W12(p,q)$, $\Delta\theta2(q)$, $\Delta W23(q,r)$ and $\Delta\theta3(r)$ calculated in this way are added to the weighting data and threshold value data $W12(p,q)$, $\theta2(q)$, $W23(q,r)$ and $\theta3(r)$, respectively, to correct them.

If there are "A" sets of combinations of input data and training data, those processings are repeated "A" times on all sets of said combinations. With this, one-time learning operation is finished. Predetermined times of such learnings are subsequently executed.

For example, for the learning of a problem of exclusive-OR (XOR) as shown in Table 1 described at the end of the specification, the numbers of neurons are two for the input layer and one for the output layer, and the hidden layer may have any number of neurons. In this example, the sets of the combinations of input data and training data is four.

As mentioned above, in the conventional back propagation operation, only weighting data and threshold values were subject to change by learning. The above described learning process is further described with reference to FIG. 18.

FIG. 18 is a flowchart showing an example of the learning algorithm according to the traditional back propagation operation.

In step S1, an input data pattern is selected (in the example of Table 1, one of four sets of input data is selected), and the selected data is supplied to the input layer.

In step S2, predetermined calculations are performed in the input hidden and output layers using the input data. By this, data (calculation result) is output from the output layer.

In step S3, the output data is compared with the training data corresponding to the selected input data, and error data "E" is calculated by equation (11).

In step S4, accumulated changing amounts $\Delta W12(p,q)$, $\Delta\theta2(q)$, $\Delta W23(q,r)$ and $\Delta\theta3(r)$ are calculated by equations (22) to (25).

In step S5, the calculated accumulated changing amounts are added to $W12(p,q)$, $\theta2(q)$, $W23(q,r)$ and $\theta3(r)$, which are weighting data and threshold value data, respectively, thereby to correct them.

In step S6, it is determined whether or not all of the input patterns have been selected. If all of the input patterns have not yet been selected, the process returns to step S1, and the process moves to step S7 if they have all been selected.

In step S7, it is determined that one learning operation has been completed.

In step S8, it is determined whether or not the learning has been completed predetermined times, and the process returns to step S1 if it has not been completed and terminates if it has been completed. Alternatively, in step S8, it may by determined whether or not output data can be obtained with precision higher than a predetermined value, that is, whether or not the error data "E" has become smaller than a predetermined one.

The functions of the above described neural network is described more specifically using FIG. 19 in which input data and training data as shown in Table 1 are stored in an input/training data memory means 11, for instance. A selection means 12 sequentially transfers input data from the memory means 11 to neurons $100(p)$ of the input layer, and simultaneously sequentially outputs training data corresponding to the transferred input data to error calculation means 13.

Weighting calculation means 51 multiplies each output signal $XO1(p)$ of neurons $100(p)$ by weighting data $W12(p,q)$ stored in weighting data memory means 21 and outputs the result to each neuron $200(q)$ of the hidden layer. Similarly, weighting calculation means 52 multiplies each output signal $XO2(q)$ of neurons $200(q)$ by weighting data $W23(q,r)$ stored in weighting data memory means 22 and outputs the result to each neuron $300(r)$ of the output layer.

Transfer function calculation means 61 performs the calculations shown in equations (7), (8), etc. in each neuron $200(q)$, using the input data and the threshold values $\theta2(q)$ stored in threshold value memory means 31. Similarly, transfer function calculation means 62 performs the calculations shown in equations (9), (10), etc. within each neuron $300(r)$, using the input data and the threshold values $\theta3(r)$ stored in threshold value memory means 32.

The error calculation means 13 calculates error data "E" by performing the calculation of equation (11) using the training data and the data output from the output layer.

Accumulated changing amount calculation means 20 uses error data "E" and weighting data $W12(p,q)$ to calculate accumulated changing amount $\Delta W12(p,q)$. In addition, using the error data "E" and weighting data $W23(q,r)$, it calculates accumulated changing amount $\Delta W23(q,r)$.

Accumulated changing amount calculation means 30 uses error data "E" and threshold values $\theta2(q)$ to calculate accumulated changing amount $\Delta\theta2(q)$. Also, using the error data "E" and threshold values $\theta3(r)$, it calculates accumulated changing amount $\Delta\theta3(r)$.

The accumulated changing amounts $\Delta W12(p,q)$, $\Delta\theta2(q)$, $\Delta W23(q,r)$ and $\Delta\theta3(r)$ calculated in the individual accumulated changing amount calculation means 20 and 30 are added, in the adding means 23, 33, 24 and 34, respectively, to $W12(p,q)$, $\theta2(q)$, $W23(q,r)$ and $\theta3(r)$ which are the weighting data and threshold values respectively stored in the memory means 21, 31, 22 and 32. The weighting data and threshold values after the additions or change are stored again in the memory means 21, 31, 22 and 32.

In such conventional back propagation, the learning speed and precision of a neural network largely varied depending on the characteristics (in the case of a sigmoid function, the value of gradient "k") of the transfer function of individual neurons (in the above described example, sigmoid function), and sometimes the learning did not advance or the error could not converge.

A table 2 shows the result obtained by the learning of the problem of exclusive-OR as shown in Table 1 by a neural network which uses a sigmoid function as a transfer function according to the prior art. The neural network used in the learning comprises two neurons for the input layer, three neurons for the hidden layer and one neuron for the output layer. Table 2 shows the error sum of squares after the learning was performed ten thousand times respectively for the gradients "k" of the sigmoid function being fixed at 0.1, 1.0, 2.0, 3.0 and 10.0. The error sum of squares is the error data for one-time learning, namely, the mean value of four kinds of E's calculated when all of the four input patterns are supplied, and it is defined by equation (11).

As mentioned above, the learning speed and precision of the neural network greatly changes when the gradient "k" of the sigmoid function varies. Accordingly, a learning with high precision can be performed in a short time if the gradient "k" is set to an optimum value.

However, only the fact that the optimum value of the gradient "k" depends on the problem and the number of the neurons constituting the neural network has been revealed by the studies which have been made up to now, and the rule of trial and error must be applied for each problem to find the optimum value of "k", which is cumbersome and time-consuming. In addition, sufficient precision cannot be obtained unless the value of "k" is set at a different value for each neuron.

SUMMARY OF THE INVENTION

It is the object of the present invention to provide a neural network wherein the characteristics of the transfer function (gradient "k" for a sigmoid function, and various coefficients for other power or trigonometric function) can automatically be optimized independent of the problem to be solved and the number of the neurons constituting the network.

In the present invention, weighting data and threshold values are changed through learning, and at least one characteristic data (such as a coefficient) for determining the characteristics of the transfer function of each neuron is also changed through learning.

By changing each characteristic data through learning, the characteristics of each transfer function is optimized so as to be different for each neuron.

BRIEF DESCRIPTION OF THE DRAWING

FIGS. 24A–24D describe equations 1, 2, 11–34 which are used for the present invention.

DETAILED DESCRIPTION OF THE PREFERRED EMBODIMENT

The present invention is now described in detail with reference to the drawings.

Figure 2:
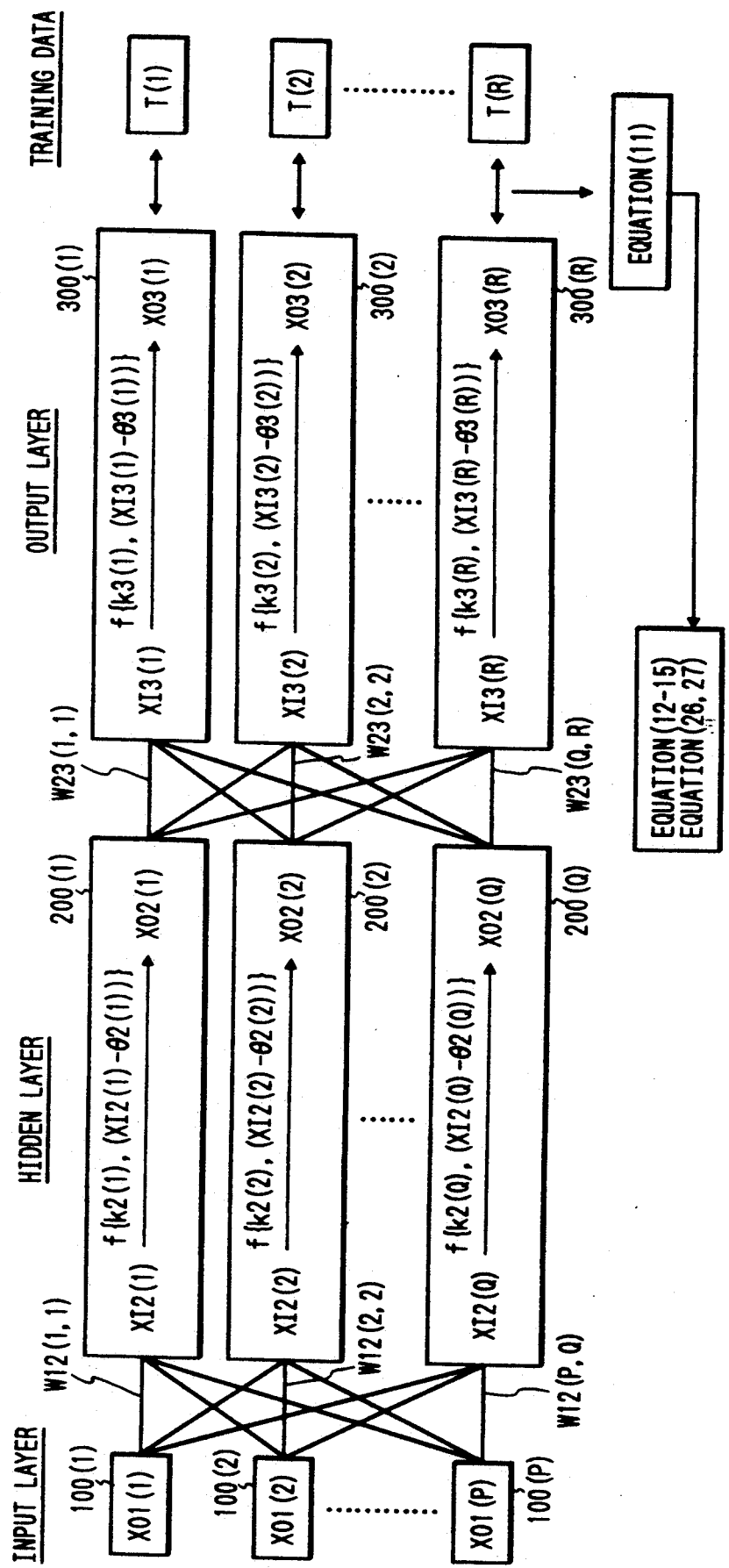
FIG. 2 is a conceptual diagram for explaining a part of the learning algorithm of the embodiment of the present invention.
Figure 17:
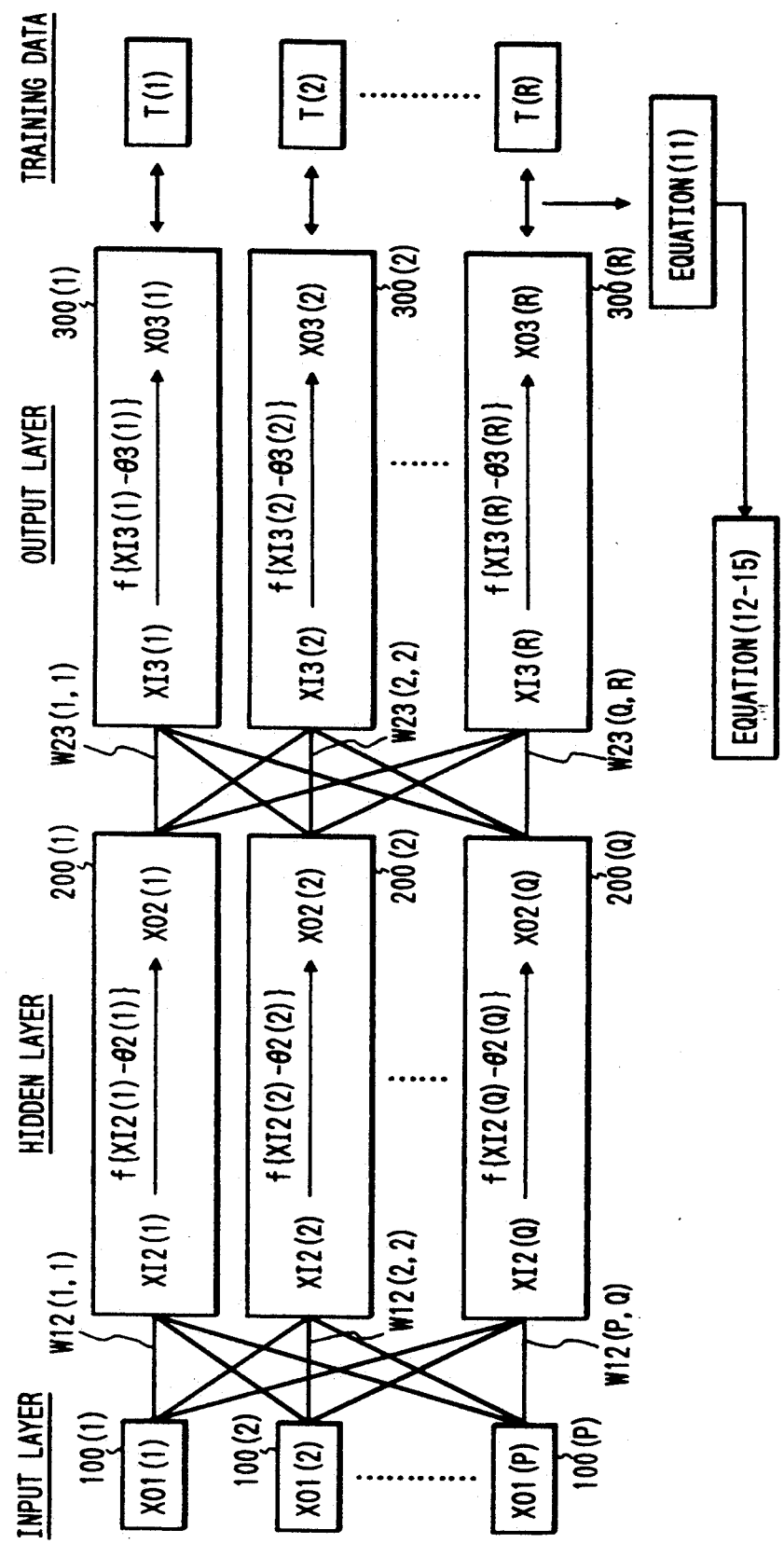
FIG. 17 is a conceptual diagram for explaining the main part of the learning algorithm according to the conventional back propagation.

FIG. 2 is a conceptual diagram for explaining the main part of the learning algorithm according to one embodiment of the present invention. In the figure, the same symbols as in FIG. 17 represent the same or equivalent portions.

The transfer function of the individual neurons constituting the hidden layer is a sigmoid function expressed by equation (1), and $k2(q)$ ($q=1 \sim Q$) represents the gradient of the sigmoid function similarly to "k" in the equation (1). The variable "x" of the sigmoid function of the hidden layer is $\{X12(q) - \theta2(q)\}$ (q=1~Q).

Similarly, the transfer function of the individual neurons constituting the output layer is also a sigmoid function, and k3(r) (r=1~R) represents the gradient thereof. The variable "x" of the sigmoid function of the output layer is $\{X13(r) - \theta3(r)\}$ (r=1~R).

In a neural network having the above-mentioned construction, error data "E" is calculated from equation (11). Using the error or cost function "E", equations (12) to (15) are calculated. Of course, in this case, the calculations are performed for all the combinations of each of variables W23(q,r), θ3(r), W12(p,q) and θ2(q) (p=1~P, q=1~Q, r=1~R) as described above. Equations (26) and (27) are also calculated. These calculations are also performed for all the combinations of each of variables k3(r) and k2(q) (r=1~R, q=1~Q).

Then, the changing amounts of current processing of the respective weighting data and threshold values ΔW12(p,q)0, Δθ2(q)0, ΔW23(q,r)0 and Δθ3(r)0 are determined by equations (16) to (19).

Similarly, the changing amounts of current processing Δk2(q)0 and Δk3(r)0 for the respective gradients k2 and k3 are determined by equations (28) and (29). In addition, the various changing amounts in the one-time-before (previous), two-time-before, . . . , N-time-before processings are discriminated by replacing the suffix 0 of the changing amount of current processing by 1~N, as shown in equations (20) to (30).

The various changing coefficients in the current, one-time-before, two-time-before, . . . , N-time-before processings are determined as shown in equations (21) and (31). Each of the changing coefficients α0~αN, β0~βN and γ0~γN may be preset to any value. The accumulated changing amounts ΔW12(p,q), Δθ2(q), ΔW23(q,r) and Δθ3(r) used in current processing are calculated by equations (22) to (25), and the accumulated changing amounts Δk2(q) and Δk3(r) are calculated from equations (32) and (33).

The accumulated changing amounts ΔW12(p,q), Δθ2(q), ΔW23(q,r), Δθ3(r), Δk2(q) and Δk3(r) calculated in the described method are respectively added to the weighting data and threshold values W12(p,q), θ2(q), W23(q,r) and θ3(r), and gradients k2(q) and k3(r) to correct them. In equations (22) to (25) and equations (32) and (33), each accumulated changing amount may be calculated using the changing amount of current processing and that of at least one time before processing.

If there are "A" sets of combinations of the input data and training data, these processings are performed A-times for all the combinations. With this, one-time learning is completed. Such learning is subsequently executed predetermined times.

Figure 3:
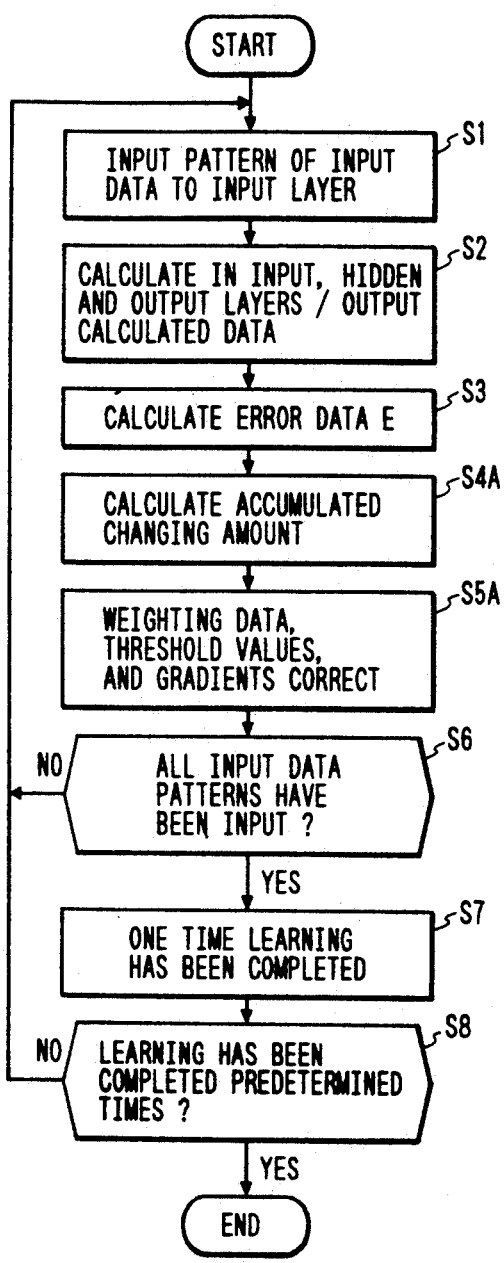
FIG. 3 is a flowchart showing the learning algorithm of the embodiment of the present invention.
Figure 18:
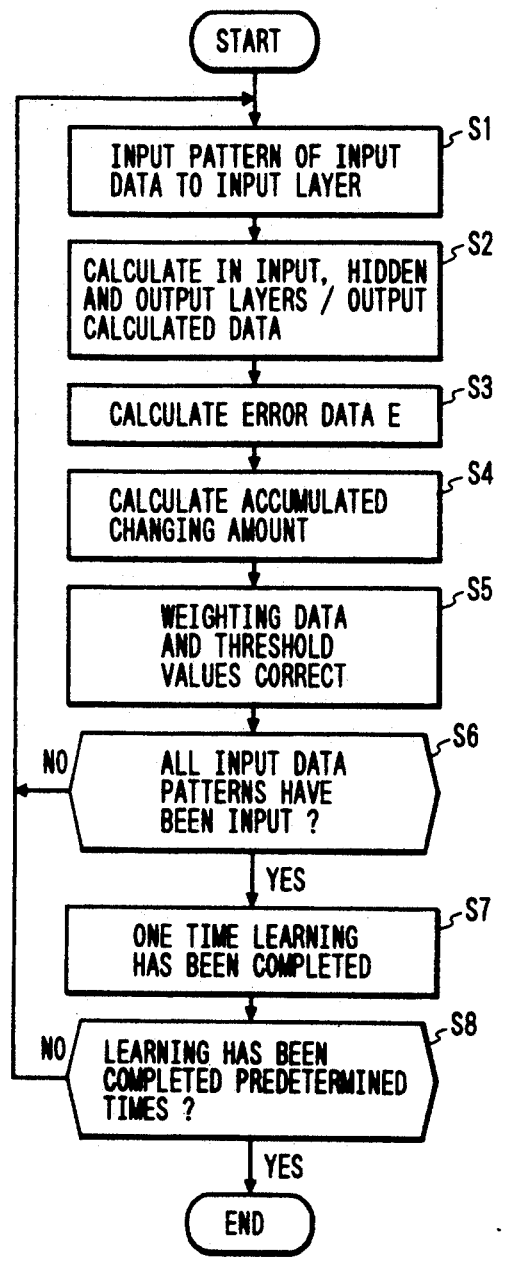
FIG. 18 is a flowchart showing an example of the learning algorithm according to the conventional back propagation.

The learning algorithm in the embodiment of the present invention changes or corrects the weighting data, threshold values and gradients at step S5A, as shown in the flowchart of FIG. 3. Of course, in the previous step S4A, the accumulated changing amounts Δk2(q) and Δk3(r) for changing gradients are also calculated in addition to the accumulated amounts calculated in the prior art.

If "x" and "k" of the sigmoid function expressed by equation (1) are variables, partial differentiations by "x" and "k" can be expressed by equation (34).

Figure 1:
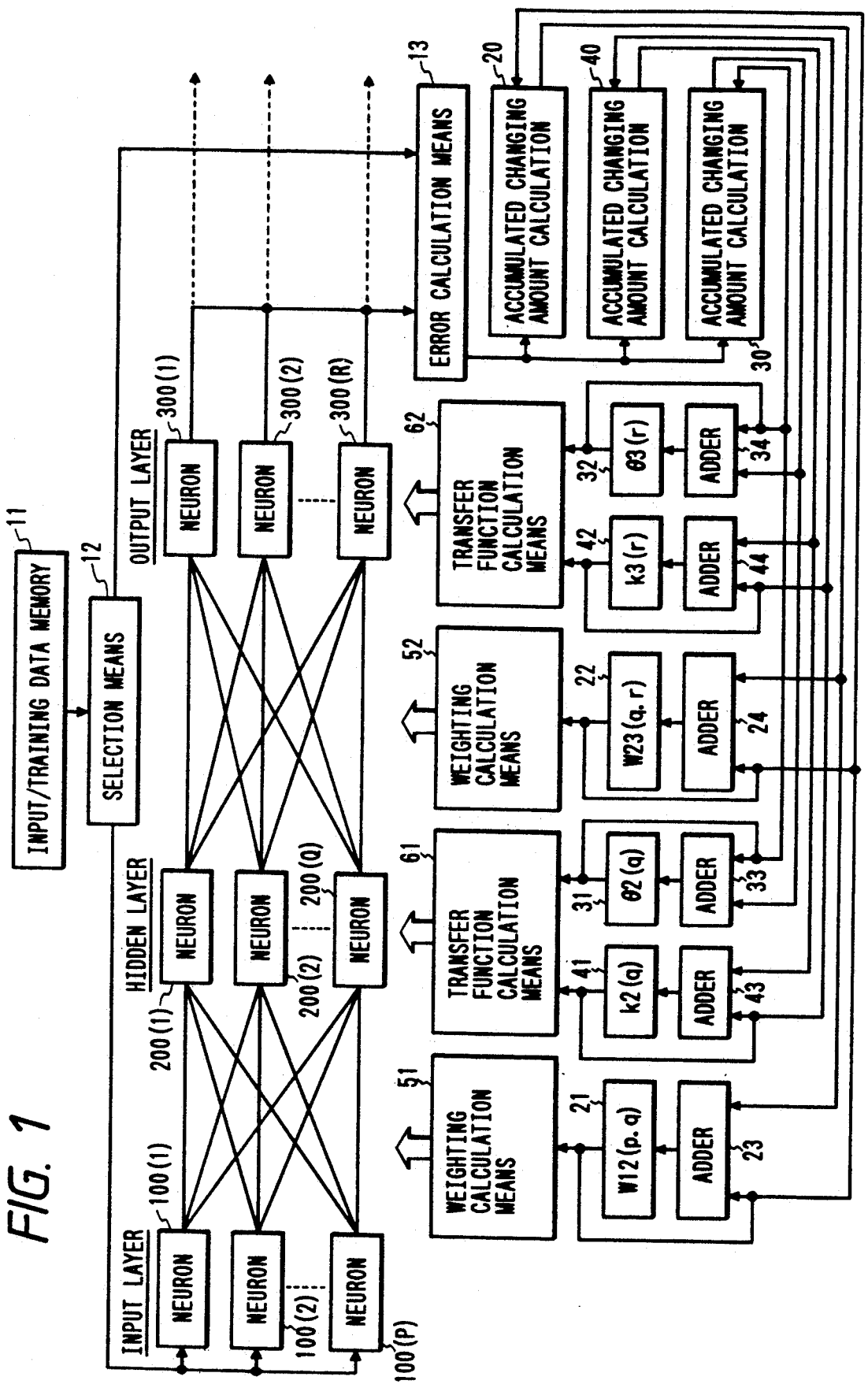
FIG. 1 is a functional block diagram of an embodiment of the present invention.
Figure 19:
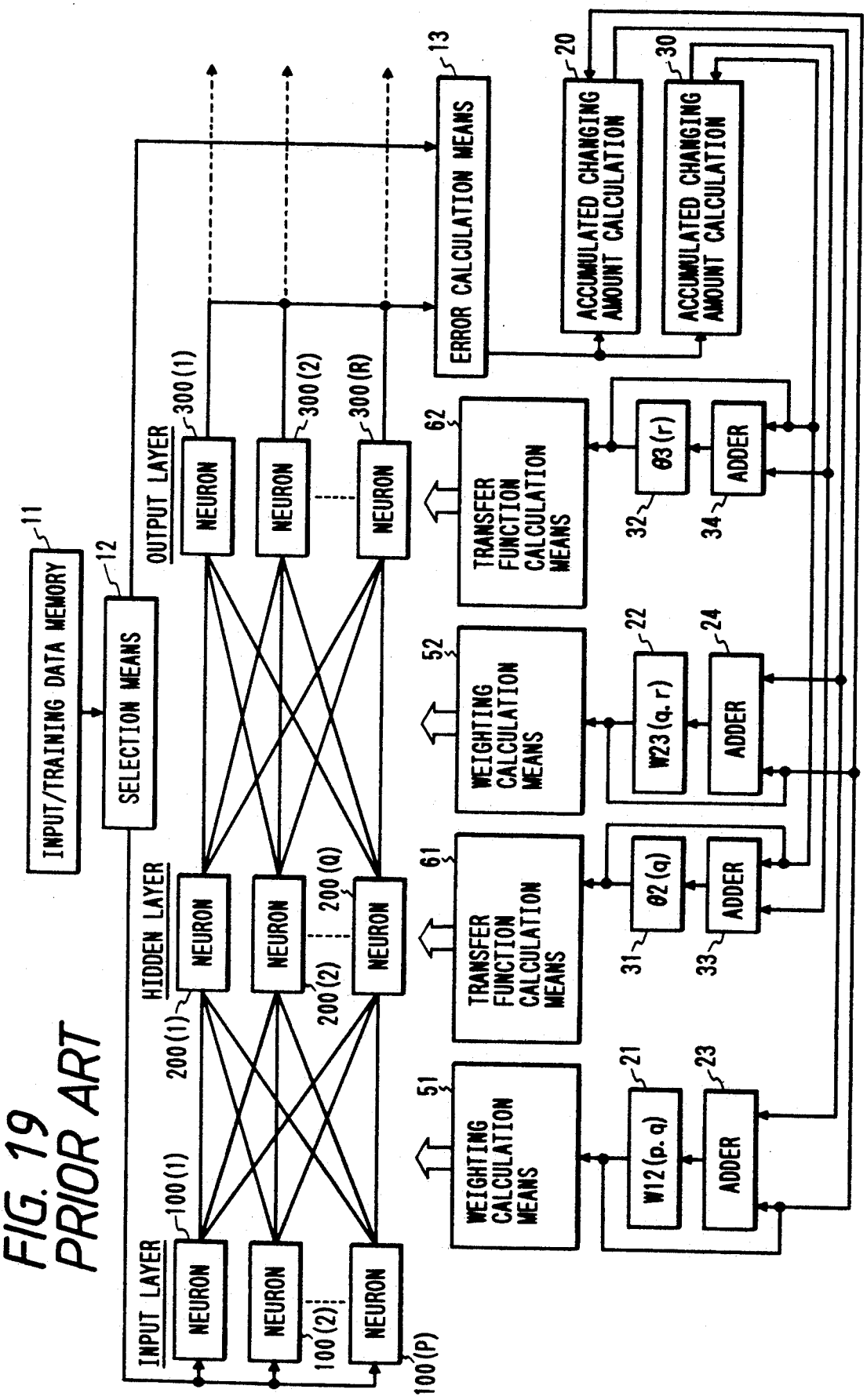
FIG. 19 is a functional block diagram of the conventional neural network.

The embodiment of the present invention is described more specifically with reference to the functional block diagram of FIG. 1 in which the same symbols as in FIG. 19 represent the same or equivalent portions.

In FIG. 1, the transfer function calculation means 61 and 62 perform calculations using sigmoid functions as described in connection with FIG. 19. The gradients k2(q) and k3(r) of the sigmoid functions are stored in the gradient memory means 41 and 42, respectively.

Accumulated changing amount calculation mean 40 calculates accumulated changing amount Δk2(q) using the error data "E" and gradient k2(q). In addition, using the "E" and gradient k3(r), the accumulated changing amount Δk3(r) is calculated. The accumulated changing amounts Δk2(q) and Δk3(r) are added to the gradients k2(q) and k3(r) stored in memory means 41 and 42 in adding means 43 and 44. The gradients corrected by the addition are newly stored in the memory means 41 and 42 for gradient correction.

The present inventors calculated various problems using the neural network according to the learning algorithm as described above. Several calculation results are shown below.

(1) XOR

Figure 4:
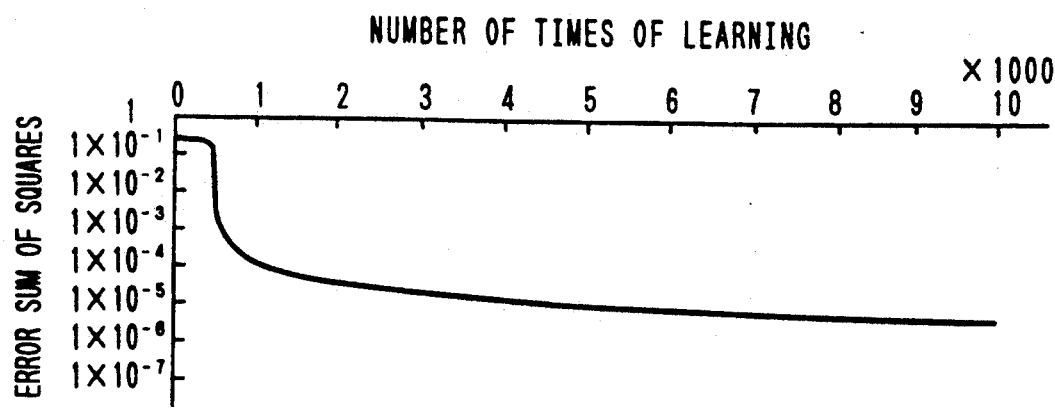
FIG. 4 is a graph showing the convergence process when the problem of XOR was learned using the embodiment of the present invention.
Figure 5:
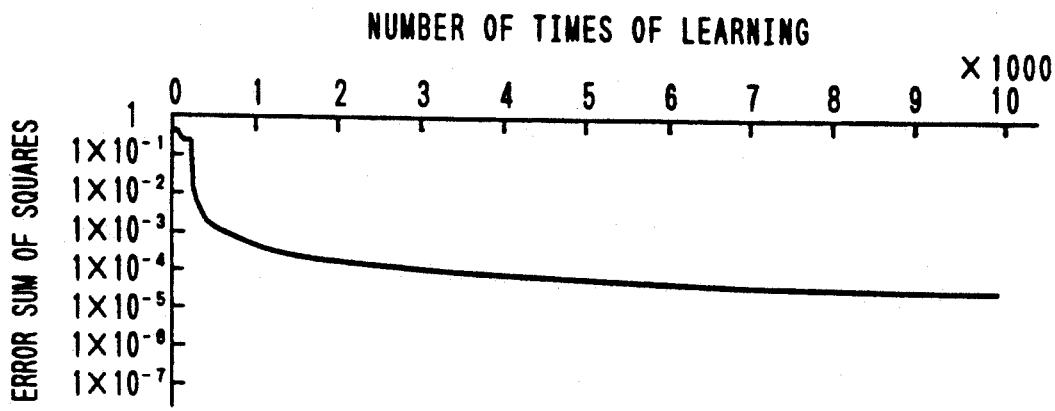
FIG. 5 is a graph showing the convergence process when the problem of XOR was learned using conventional approach.

FIG. 4 shows a convergence state, which was obtained when the problem of XOR shown in Table 1 was learned by the approach of the present invention, using a neural network consisting of a two-neuron input layer, three-neuron hidden layer and one-neuron output layer. The transfer function of each neuron is a sigmoid function, and in FIG. 4, the relationship between the number of times of learning (abscissa) and error sum of squares (ordinate) is shown. For the purpose of comparison the relationship between the number of times of learning (abscissa) and error sum of squares ordinate) according to the conventional method, in which the gradient "k" of the sigmoid function is not learned, is shown in FIG. 5. FIG. 5 is an example for k=2.

In Table 3, learning precision obtained by ten thousand times learnings, that is the error sum of squares, and calculation time required for that are shown. For calculation, a workstation of 20 [MIPS] was used.

Table 4 shows the number of times of learning required before the error sum of squares $1 \times 10^{-4}$ was obtained and the calculation time spent for that. As seen from these tables, regarding the problem of XOR, the learning precision could be increased by 10 to 100 times for the same number of times of learning as compared with the conventional method in accordance with the embodiment of the present invention, and the number of times of learning for obtaining the same learning precision can be decreased by at least ⅛ to ¼ times (½ to ⅓ times in calculation time) as compared with the conventional method.

(2) Multiplication

Figure 7:
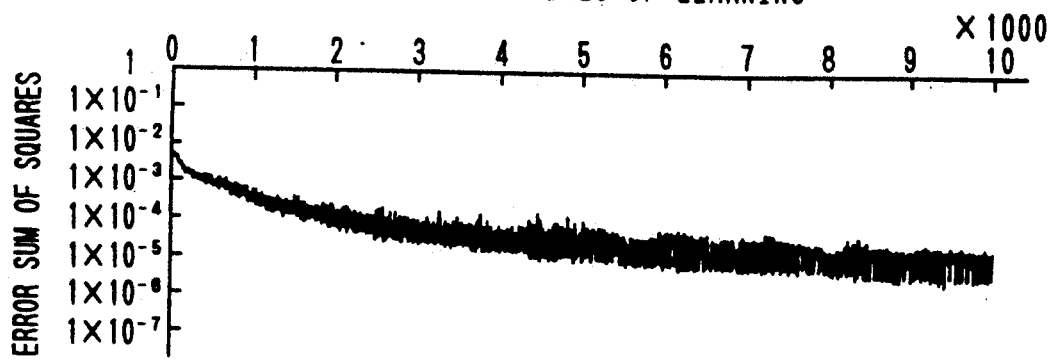
FIG. 7 is a graph showing the convergence process when the problem of multiplication was learned using the embodiment of the present invention.

FIG. 7 shows a learning process when a problem of multiplication as shown in Table 7 was learned by the technique of the present invention using a neural network, which consists of a two-neuron input layer, a nine-neuron hidden layer and a single-neuron output layer. The transfer function of each neuron is a sigmoid function. In FIG. 7, the relationship between the number of times of learning (abscissa) and error sum of squares (ordinate) is shown as in FIGS. 4 and 5.

Figure 8:
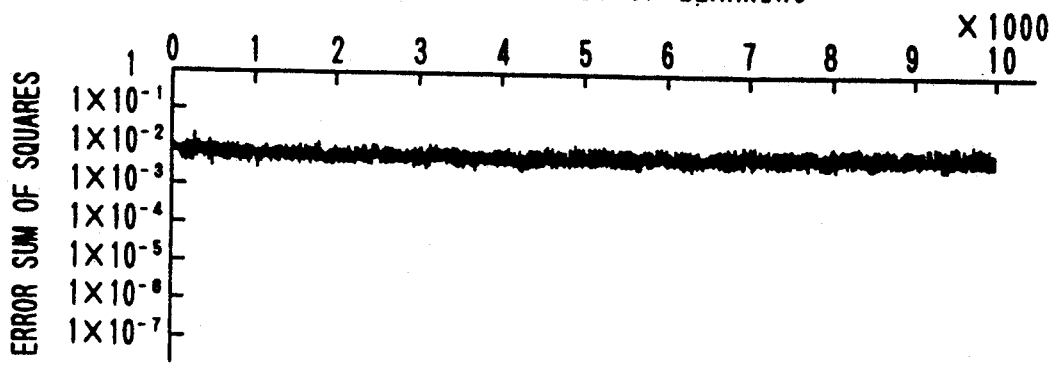
FIG. 8 is a graph showing the process when the problem of multiplication was learned using the conventional approach.

The relationship between the number of times of learning (abscissa) and error sum of squares (ordinate) according to the conventional approach is shown for comparison in FIG. 8. FIG. 8 is an example for k=2.

As seen from the comparison of the two figures, even a problem for which learning precision was hardly increased by the conventional approach can be learned up to considerable precision in the present invention.

(3) Special problem

Figure 9:
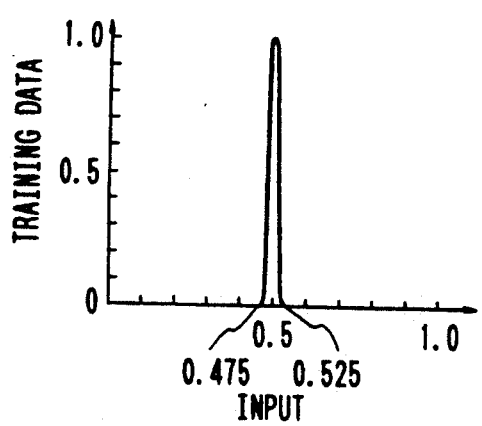
FIG. 9 is a graph showing an example of a special problem.

The result of a learning of a functional relation as shown in FIG. 9 is described below. The network used consists of one neuron for the input layer, seven neurons for the hidden layer and one neuron for the output layer, and the transfer function of each neuron is a sigmoid function.

Table 5 shows the calculation result of the embodiment of the present invention, in which error sums of squares are shown with a changing coefficient of $\alpha=0.9$ and the changing coefficients $\beta$ and $\gamma$ being parameters.

Figure 10:
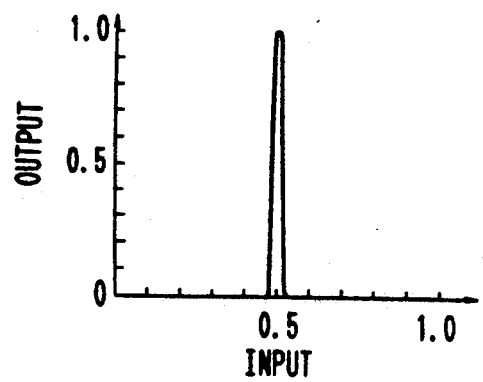
FIG. 10 is a graph showing the result when the example special problem of FIG. 9 was learned using the embodiment of the present invention.
Figure 11:
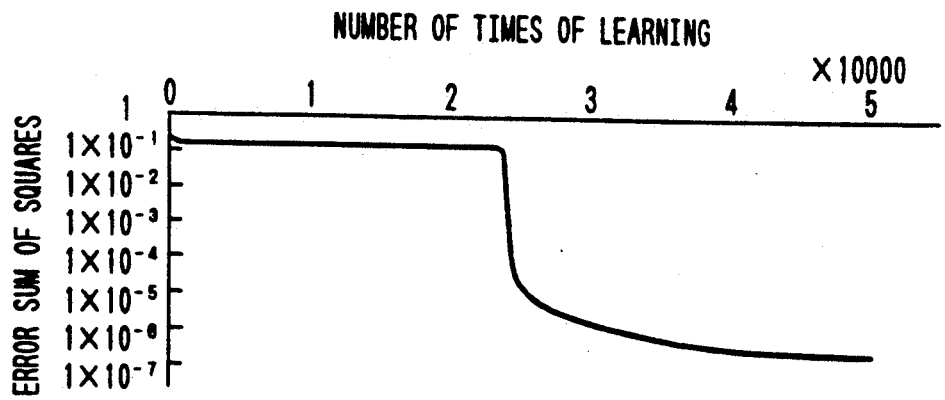
FIG. 11 is a graph showing the convergence process when the example special problem of FIG. 9 was learned using the one embodiment of the present invention.

In table 5, each of marks '×' indicates that convergence was not achieved because of a too large error and learning could not be made at last, each of marks '△' indicates that the converged error sum of squares was in the order of $0.1 \times 10^{-5}$, each of marks '◯' indicates that the converged error sum of squares was in the order of $0.1 \times 10^{-6}$, and a mark '⊙' indicates that the converged error sum of squares was the smallest and its value was $0.278 \times 10^{-6}$. The input and output data for the best case are shown in FIG. 10. In FIG. 11, the relationship between the number of times of learning (abscissa) and error sum of squares (ordinate) is shown, as in FIGS. 4 and 5.

Figure 12:
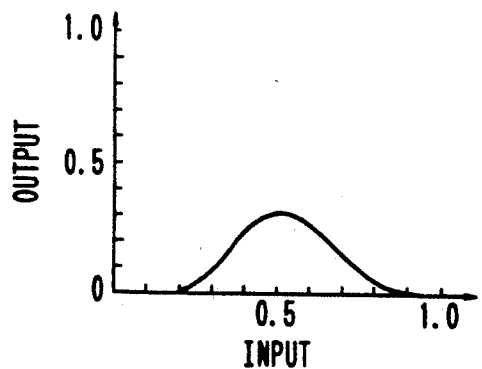
FIG. 12 is a graph showing the result when the example special problem of FIG. 9 was learned using the conventional approach.
Figure 13:
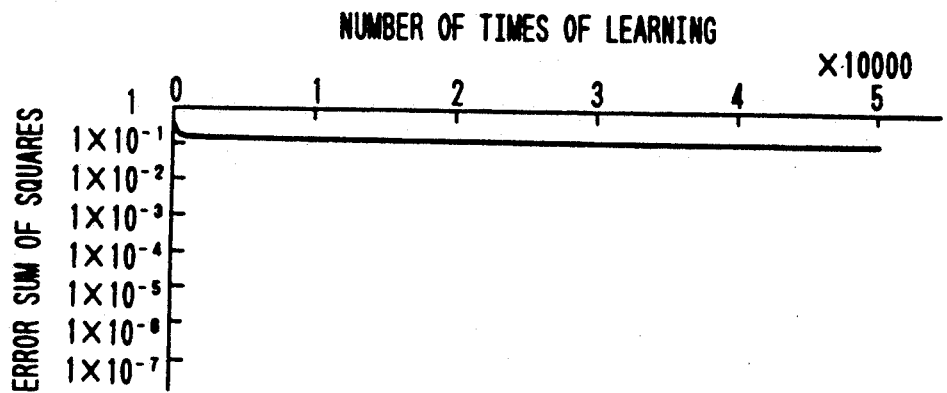
FIG. 13 is a graph showing the process when the example special problem of FIG. 9 was learned using the conventional approach.
Figure 14:
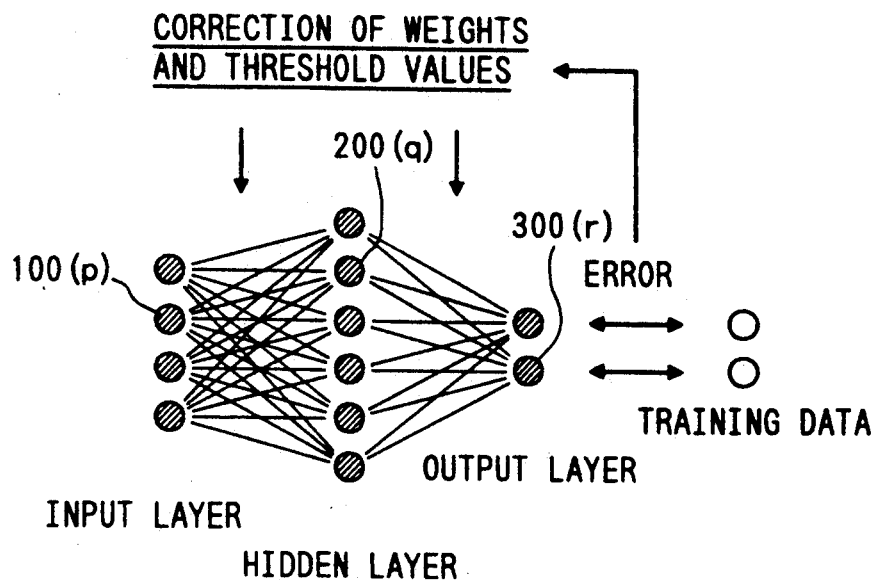
FIG. 14 is a diagram showing an example of the neural network of a three-layer structure.
Figure 15:
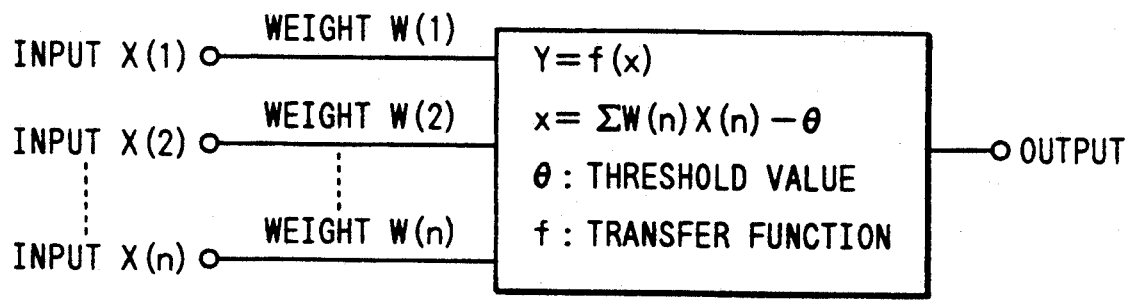
FIG. 15 is a conceptual diagram showing a neuron which is an element of the neural network.
Figure 16:
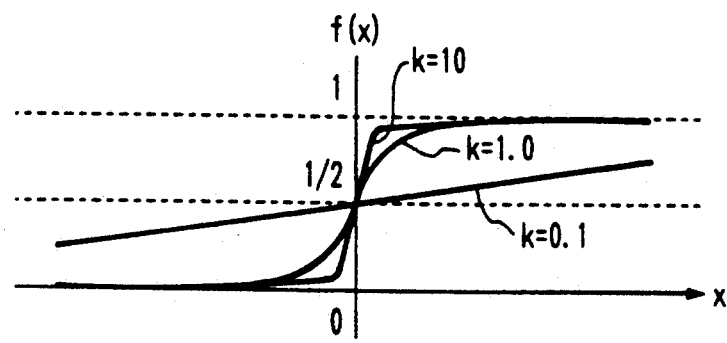
FIG. 16 is a representation showing an example characteristic of a sigmoid function.

For the purpose of comparison, the calculation result by the conventional approach is shown in Table 6. Table 6 shows error sums of squares when the changing coefficients $\alpha$ and $\beta$ are parameters. The relation between the input and output data for $\alpha=0.1$ and $\beta=0.1$ which provided the smallest error sum of squares is shown in FIG. 12. In FIG. 13, the relationship between the number of times of learning (abscissa) and error sum of squares (ordinate) is shown.

It will be realized from the foregoing that the problem of FIG. 9 can be learned by the present invention with considerable high precision, though it can be hardly learned by the conventional learning technique.

Now, description is made of another embodiment in which a power function is used as the transfer function.

(4) XOR of Table 1

Figure 6:
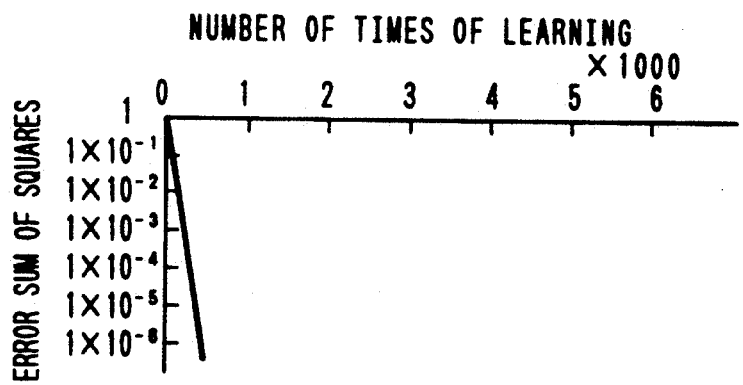
FIG. 6 is a graph showing the convergence process when the problem of XOR was learned according to another embodiment of the present invention.

The neural network used consists of two neurons for the input layer, two neurons for the hidden layer and one neuron for the output layer, and the transfer function of each neuron is a power function ($ax^b+c$). Two coefficients b1 and b2 of the power functions for the two neurons of the hidden layer were set at 1.0 and 2.0, respectively, and constants a1 and a2, and c1 and c2 were learned. FIG. 6 shows the attenuation state of the error sum of squares (ordinate) vs. the number of times of learning (abscissa). Table 8 shows the result of a thousand times learnings. The error sum of squares for this was $1.40 \times 10^{-13}$, and the required calculation time was 0.93 sec. For the purpose of comparison, the result of a thousand times learnings performed in the conventional method using a sigmoid function is shown in Table 9. The error sum of squares for said result was $7.31 \times 10^{-5}$, and the required calculation time was 1.15 sec. It is understood from these comparisons that a learning with higher precision can be accomplished by the present invention in a shorter time.

(5) Interpolation of periodic function

Description is made of a further embodiment of the present invention in which a trigonometric function is used as the transfer function. The exercise is to obtain a periodic function which interpolates a periodic function, in which output values (ordinate) are given corresponding to discrete values of input (abscissa) as shown in Table 10 and by black points in FIG. 20. The network used consists of one neuron for the input layer, two neurons for the hidden layer and one neuron for the output layer, the transfer function of each neuron is a trigonometric function {a Sin(cx)+b Sin(dx)}, and all constants in the trigonometric function were learned.

Figure 20:
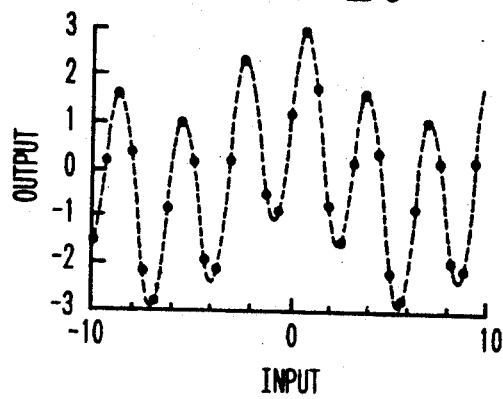
FIG. 20 is a graph showing the positions of the input points of a periodic function to be interpolated and the interpolated periodic function waveform.
Figure 23:
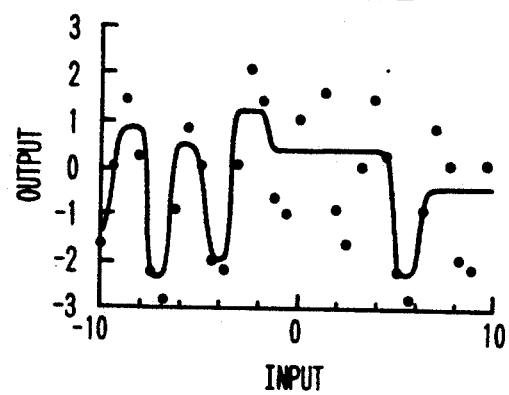
FIG. 23 is a periodic function waveform of the learning result by the approach shown in FIG. 22.
Figure 21:
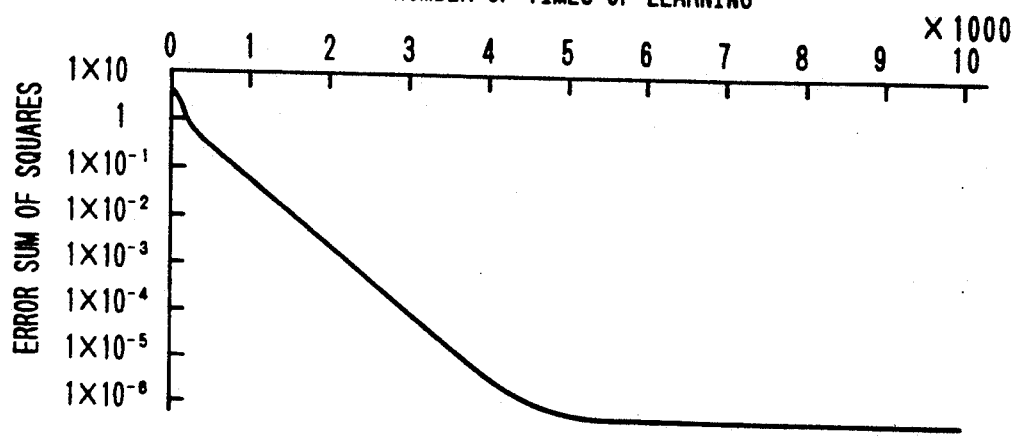
FIG. 21 is a graph showing the convergence process when the periodic function problem was learned using still another embodiment of the present invention.
Figure 22:
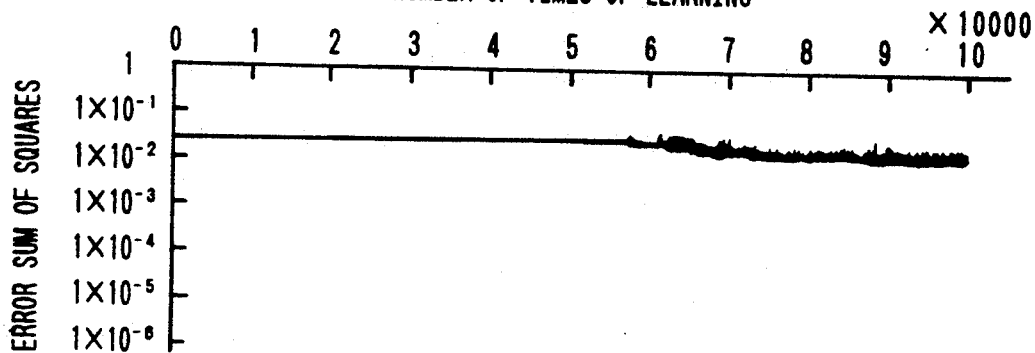
FIG. 22 is a graph showing the convergence process when the same periodic function problem as FIG. 21 was learned using the conventional approach.

The relationship between the number of times of learning (abscissa) and error sum of squares (ordinate) is shown in FIG. 21. The error sum of squares after ten thousand times learnings was $6.07 \times 10^{-7}$, and the required time was 88 sec. The waveform of the periodic function obtained by the learning is shown by a dotted line in FIG. 20. For comparison, the result of a hundred thousand times learnings by the conventional method using a sigmoid function, which is similar to FIG. 21, is shown in FIG. 22. The error sum of squares after the hundred thousand times learnings was $1.13 \times 10^{-2}$, and the required time was 21 sec. It is seen from FIG. 22 that the error sum of squares does not readily decrease. Also, the waveform of the periodic function obtained by the prior art learning, which corresponds to FIG. 20, is shown in FIG. 23. As seen from the comparison of FIGS. 20 and 23, and/or FIGS. 21 and 22, a learning with higher precision can be performed by the present invention in a shorter time.

Although, in the above description, the learning (changing) of the weighting data, threshold values and gradients are performed by adding accumulated changing amounts of past changing amounts to the weighting data, threshold values and gradients, as shown in equations (22) to (25) and equations (32) and (33), the learning may be made using only the changing amounts of current processing.

Moreover, in the above described embodiments, the changing coefficients $\alpha$, $\beta$ and $\gamma$ are common for the weighting data, threshold values and gradients of each of the hidden and output layers, but coefficients different among layers and/or neurons may be used.

In the above described embodiments, if there are a plurality of input data and training data as shown in Table 1 and FIG. 6, the combination of input data and training data are sequentially selected out of them and are calculated as shown in FIG. 3, and it is determined that one learning has been completed when the calculations have been performed using all the sets of input data and training data. As a result, all combinations of input and training data are evenly used to perform the learning. However, for instance, data may be selected at random from a plurality of input and training data to perform a learning, without evenly using data.

Although the weighting data, threshold values and gradients were to be corrected each time error data is detected in the foregoing description, the changing amounts (or the accumulated changing amounts) used for correction may be stored, and when the learning has been completed a predetermined number of times, they may be collectively added to the weighting data, threshold values and gradients to make data correction.

Although the foregoing description has been made to the effect that error data "E" is calculated using training data with an error function as shown in equation (11) being as a cost function, it is also possible that an appropriate cost function is used instead of training data and the learning is made so that the calculation result of the cost function becomes a predetermined value (for instance, the smallest value).

The above described various calculations can be executed by software using a microcomputer, but they may be accomplished instead by hardware circuit networks.

As apparent from the above description, in accordance with the present invention, at least one characteristic data which determines the characteristics of the transfer function of each neuron is to be learned, and thus the transfer function characteristics are different for each neuron independently of the nature of a problem and/or the number of neurons and become optimum. Accordingly, a learning with high precision can be performed in a short time.

If it is taken into consideration that neural networks have been studied on the analogy of the neural circuit networks of living things and the individual nerve cells of a living thing are not always uniform in the same and single living body, it can be said that the learning system of the present invention is quite appropriate.

TABLE 1

| Input | | Training Data |
|---|---|---|
| X (1) | X (2) | Y |
| 0 | 1 | 1 |
| 1 | 0 | 1 |
| 0 | 0 | 0 |
| 1 | 1 | 0 |

TABLE 2

| Gradient of Sigmoid Function | Error Sum of Squares After 10000 Learnings |
|---|---|
| 0.1 | $2.5 \times 10^{-1}$ |
| 1.0 | $1.6 \times 10^{-4}$ |
| 2.0 | $3.3 \times 10^{-5}$ |
| 3.0 | $2.3 \times 10^{-5}$ |
| 10.0 | $5.0 \times 10^{-1}$ |

TABLE 3

| | Error Sum of Squares | Calculation Time [sec] |
|---|---|---|
| Conventional Method | $0.326 \times 10^{-4}$ | 5.45 |
| Present Invention | $0.506 \times 10^{-5}$ | 5.84 |

TABLE 4

| | Number of Times of Learning | Calculation Time [sec] |
|---|---|---|
| Conventional Method | 3592 | 1.99 |
| Present Invention | 1184 | 0.73 |

TABLE 5

$\alpha = 0.9$

| Changing Coefficient $\beta$ | Changing Coefficient $\gamma$ | | | | |
|---|---|---|---|---|---|
| | 0.1 | 0.3 | 0.5 | 0.7 | 0.9 |
| 0.1 | Δ | Δ | x | x | x |
| 0.3 | Δ | x | x | x | x |
| 0.5 | x | x | ○ | ⊚ | ○ |
| 0.7 | x | x | ○ | ○ | ○ |
| 0.9 | x | x | x | Δ | Δ |

TABLE 6

| Changing Coefficient $\alpha$ | Changing Coefficient $\beta$ | | | | |
|---|---|---|---|---|---|
| | 0.1 | 0.3 | 0.5 | 0.7 | 0.9 |
| 0.1 | 0.147 | 0.159 | 0.171 | 0.172 | 0.173 |
| 0.3 | 0.159 | 0.161 | 0.167 | 0.173 | 0.178 |
| 0.5 | 0.171 | 0.172 | 0.173 | 0.174 | 0.177 |
| 0.7 | 0.175 | 0.176 | 0.176 | 0.177 | 0.177 |
| 0.9 | 0.178 | 0.178 | 0.179 | 0.179 | 0.179 |

TABLE 7

| Input | | Training Data Y |
|---|---|---|
| X (1) | X (2) | |
| 0 | 0 | 0 |
| 1 | 0 | 0 |
| 2 | 0 | 0 |
| 3 | 0 | 0 |
| 4 | 0 | 0 |
| 5 | 0 | 0 |
| 0 | 1 | 0 |
| 1 | 1 | 1 |
| 2 | 1 | 2 |
| 3 | 1 | 3 |
| 4 | 1 | 4 |
| 5 | 1 | 5 |
| 0 | 2 | 0 |
| 1 | 2 | 2 |
| 2 | 2 | 4 |
| 3 | 2 | 6 |
| 4 | 2 | 8 |
| 5 | 2 | 10 |
| 0 | 3 | 0 |
| 1 | 3 | 3 |
| 2 | 3 | 6 |
| 3 | 3 | 9 |
| 4 | 3 | 12 |
| 5 | 3 | 15 |
| 0 | 4 | 0 |
| 1 | 4 | 4 |
| 2 | 4 | 8 |
| 3 | 4 | 12 |
| 4 | 4 | 16 |
| 5 | 4 | 20 |
| 0 | 5 | 0 |
| 1 | 5 | 5 |
| 2 | 5 | 10 |
| 3 | 5 | 15 |
| 4 | 5 | 20 |
| 5 | 5 | 25 |

TABLE 8

| Input | | Output |
|---|---|---|
| X (1) | X (2) | Y |
| 0.00000 | 0.00000 | 0.00000 |
| 0.00000 | 1.00000 | 1.00000 |
| 1.00000 | 0.00000 | 1.00000 |
| 1.00000 | 1.00000 | 0.00000 |

TABLE 9

| Input | | Output |
|---|---|---|
| X (1) | X (2) | Y |
| 0.00000 | 0.00000 | 0.00985 |
| 0.00000 | 1.00000 | 0.97118 |
| 1.00000 | 0.00000 | 0.97214 |
| 1.00000 | 1.00000 | 0.03446 |

TABLE 10

| Input | Training Data | |
|---|---|---|
| −10.000 | −1.542 | |
| −9.372 | +0.185 | |
| −8.743 | +1.623 | |
| −8.115 | +0.388 | |
| −7.487 | −2.165 | |
| −6.858 | −2.785 | |
| −6.230 | −0.788 | |
| −5.602 | +1.014 | |
| −4.973 | +0.204 | |
| −4.345 | −1.907 | |
| −3.717 | −2.110 | One Cycle |
| −3.088 | +0.239 | |
| −2.460 | +2.291 | |
| −1.832 | +1.607 | |
| −1.204 | −0.516 | |
| −0.575 | −0.867 | |
| +0.053 | +1.212 | |
| +0.681 | +2.899 | |
| +1.310 | +1.791 | |
| +1.938 | −0.774 | |
| +2.566 | −1.542 | |
| +3.195 | +0.185 | |
| +3.823 | +1.623 | |
| +4.451 | +0.388 | |
| +5.080 | −2.165 | |
| +5.708 | −2.785 | |
| +6.336 | −0.788 | |
| +6.965 | +1.014 | |
| +7.593 | +0.204 | |
| +8.221 | −1.907 | |
| +8.850 | −2.110 | |
| +9.478 | +0.239 | |

What is claimed is:

1. A neural network comprising a plurality of neurons each performing a signal processing corresponding to a neural element, said neurons being hierarchically connected in the order of at least one input layer, at least one hidden layer and an output layer, and said input layer, hidden layer and output layer each consisting of at least one neuron, individual neurons of said hidden layer and output layer being operative to correct the data weighted by multiplying the outputs of the preceding input layer or hidden layer by predetermined weighting data with a predetermined threshold value, respectively, and to substitute the data after the correction in a predetermined transfer function to calculate output data, said neural network including:

error data calculation means operative to use a predetermined cost function to calculate error data from the output data of the output layer, weighting data correction means operative to partially differentiate said cost function with each of a plurality of weighting variables to obtain partial differentiated coefficients, and to correct said weighting data according to said partial differential coefficients.

threshold value correction means operative to partially differentiate said cost function with each of a plurality of threshold variables to obtain partial differentiated coefficients, and to correct each said threshold value according to said partial differential coefficients, and characteristic data correction means for partially differentiating said cost function, to obtain partial differentiated coefficients, with at least one characteristic variable that determines the characteristics of the respective transfer functions of said hidden layer and said output layer, and operative to correct said characteristic data according to said partial differential coefficients.

2. A neural network as set forth in claim 1 wherein said characteristic data correction means corrects said characteristic data using the partial differential coefficients obtained by partially differentiating said cost function with said at least one characteristic variable, and the previous values of said partial differential coefficients.

3. A neural network as set forth in claim 2 wherein said cost function is an error function, and said error data calculation means compares the data output from said output layer with training data corresponding to the input data supplied to said input layer and applies the comparison result to said error function, thereby to calculate error data.

4. A neural network as set forth in claim 2 wherein said weighting data correction means uses the partially differentiated value of said cost function by said weighting variables and the previous value of said partially differentiated value to correct said weighting data.

5. A neural network as set forth in claim 2 wherein said threshold value correction means uses the partially differentiated variables of said cost function by said threshold value and the previous value of said partially differentiated value to correct said threshold value.

6. A neural network as set forth in claim 1 wherein said transfer function is a sigmoid function and said characteristic variable is the gradient of the sigmoid function.

7. A neural network as set forth in claim 1 wherein said transfer function is a power function $(ax^b+c)$ and said characteristic variable is at least one constant of said power function.

8. A neural network as set forth in claim 1 wherein said transfer function is a trigonometric function $\{a \sin(cx)+b \cos(dx)\}$ and said characteristic variable is at least one constant of said trigonometric function.

9. A neural network as set forth in claim 1 wherein said cost function is an error function, and said error data calculation means compares the data output from said output layer with training data corresponding to the input data supplied to said input layer and applies the comparison result to said error function, thereby to calculate error data.

10. A neural network as set forth in claim 1 wherein said weighting data correction means uses the partially differentiated value of said cost function by said weighting variables and the previous value of said partially differentiated value to correct said weighting data.

11. A neural network as set forth in claim 1 wherein said threshold value correction means uses the partially differentiated value of said cost function by said threshold variables and the previous value of said partially differentiated value to correct said threshold value.

* * * * *